United States Patent

Nagai

[11] Patent Number: 5,590,580
[45] Date of Patent: Jan. 7, 1997

[54] LOADING POSITIONING APPARATUS

[75] Inventor: Shigekazu Nagai, Yawara-mura, Japan

[73] Assignee: SMC Corporation, Tokyo, Japan

[21] Appl. No.: 382,792

[22] Filed: Feb. 2, 1995

[30] Foreign Application Priority Data

Feb. 3, 1994 [JP] Japan .................................. 6-031808

[51] Int. Cl.⁶ .............................. F01B 3/00; F01B 29/00; F16H 27/02
[52] U.S. Cl. .................................. 92/33; 92/88; 92/136; 74/89.15; 74/459
[58] Field of Search .................... 92/7, 13.8, 88, 92/136, 33; 60/716, 718; 91/361; 74/89.15, 459

[56] References Cited

U.S. PATENT DOCUMENTS

| | | | |
|---|---|---|---|
| 3,244,022 | 4/1966 | Wysong, Jr. ............................ | 74/459 X |
| 4,509,379 | 4/1985 | Westmoreland ........................ | 92/33 X |
| 4,517,853 | 5/1985 | Tani et al. ............................. | 74/89.15 |
| 4,669,359 | 6/1987 | Shiba ...................................... | 91/361 |
| 4,807,518 | 2/1989 | Berchtold et al. ..................... | 91/361 X |
| 4,811,618 | 3/1989 | Takayama .............................. | 74/89.15 |
| 4,876,906 | 10/1989 | Jones ...................................... | 74/89.15 |
| 5,303,549 | 4/1994 | Berchtold et al. ..................... | 91/433 X |

FOREIGN PATENT DOCUMENTS

| | | | |
|---|---|---|---|
| 58-88202 | 5/1983 | Japan ....................................... | 91/361 |
| 60-146955 | 8/1985 | Japan ....................................... | 74/89.15 |
| 1-206102 | 8/1989 | Japan ....................................... | 92/88 |

*Primary Examiner*—John E. Ryznic
*Attorney, Agent, or Firm*—Oblon, Spivak, McClelland, Maier & Neustadt, P.C.

[57] ABSTRACT

A load positioning apparatus comprises a rodless cylinder which comprises a piston and a load-mounting table connected together by a coupling device, a feed screw turned and driven by an electric motor, and a pressurized fluid control and supply device. The coupling device mechanically and directly connects the piston and table. The feed screw disposed to pass through the piston in the rodless cylinder is connected to the piston with a screw coupling mechanism.

3 Claims, 8 Drawing Sheets

5,590,580

LOADING POSITIONING APPARATUS

FIELD OF THE INVENTION

This invention relates to a load positioning apparatus for determining the accurate position for stopping a load.

DESCRIPTION OF THE PRIOR ART

A known load positioning apparatus for stopping a load at a desired position comprises a rotatable feed screw, a table with a screw thread of the same pitch as the one on the feed screw cut in the internal surface thereof, a large number of balls rotatably fit between the feed screw and the screw thread, and an electric motor to turn the feed screw, stopping a load, such as a workpiece mounted on the table.

Determining the position of the load by the rotation of the electric motor, this conventional apparatus makes accurate positioning when the weight or the resistance to motion of the load is small. However, error may arise when the weight or the resistance to motion of the load is large because the electric motor is overloaded. Errors arise particularly frequently when the load positioning apparatus is used as a load-lifting balancer.

To solve this problem, improved load positioning apparatus employing a hydraulically operated rodless cylinder and a motor driven feed screw of the type described above has been proposed.

FIG. 10 shows an example of the improved load positioning apparatus just described. This load positioning apparatus 1 comprises a rodless cylinder 3 using a magnetic coupling 6 and a feed screw 5 turned by an electric motor 4 that are disposed substantially parallel to each other in a body 2. The magnetic coupling 6 that moves along the external surface of the rodless cylinder 3 synchronously with the motion of the piston and a ball nut 7 moved by the rotation of the feed screw 5 are connected to a table 8 on which a load is to be mounted.

The feed screw 5 has a thread lead angle (the angle the tangent to the screw thread makes with the plane normal to the axis of the feed screw 5) of 45 degrees or larger, whereby the feed screw 5 turns to move the ball nut 7 therealong when the ball nut 7 is pressed in the axial direction of the feed screw 5.

After moving the table carrying a load mounted thereon to near the desired stop position by supplying a pressurized fluid from a pressure control valve (not shown) to the rodless cylinder 3, the load positioning apparatus 1 substantially balances the force exerted by the load and the thrust force of the rodless cylinder 3 by adjusting the output pressure of the pressure control valve. In this state the position of the table 8 is adjusted by turning the feed screw 5 by the electric motor 4, thereby stopping the load exactly at the desired position. With the electric motor 4 driven in a state where the force exerted by the load and the resisting thrust force exerted by the piston of the rodless cylinder 3 are substantially made equal, overloading of the electric motor and possible positioning error can be prevented.

Still, this load positioning apparatus is not without disadvantage; the magnetic coupling 6 connecting the piston and table increases the diameter of the rodless cylinder 3, and the feed screw 5 disposed outside and parallel to the rodless cylinder 3 also increases the size of the load positioning apparatus 1.

SUMMARY OF THE INVENTION

A main object of this invention is to provide a much smaller load positioning apparatus comprising a combination of a rodless cylinder and a feed screw than conventional ones.

Another object of this invention is to provide a mechanism that assures an unerring and stable operation of the load positioning apparatus.

To achieve the above objects, a load positioning apparatus according to this invention comprises a rodless cylinder comprising a piston moved by the action of a pressurized fluid flowing through a cylinder bore provided in a body and a movable table for holding a load provided outside the body, with the piston and table joined together by a coupling means, and a feed screw turned by an electric motor, a device for supplying a fluid of a desired pressure to the rodless cylinder, in which the coupling means mechanically connecting the piston and table through a slit provided along the cylinder bore, the feed screw is fitted in the rodless cylinder so as to pass through the piston, and the feed screw is connected to the piston by a screw mechanism.

The screw coupling mechanism of this invention to connect the piston and feed screw comprises at least one screw thread cut in each of the piston and feed screw and multiple balls rotatably fit between the screw threads, and one each screw coupling mechanism is provided at each end of the piston.

A screw thread sealing member to seal the space between the piston and feed screw where the screw thread on the feed screw is situated is provided outside the screw coupling mechanism at each end of the piston.

The screw thread sealing member should preferably be a helical piece surrounding the screw thread, while the screw thread sealing member may be provided integrally with the piston.

The screw threads cut in the piston and feed screw should preferably have a lead angle of 45 degrees or larger.

The load positioning apparatus just described determines the position of a load by moving the load to near the desired position by actuating the rodless cylinder and then moving the load to the final position by turning and driving the feed screw by the electric motor while balancing the weight of the load and the thrust force of the piston. Otherwise, the load is moved and positioned by turning and driving the feed screw by the electric motor while pressing the load by simultaneously actuating the rodless cylinder and electric motor. Thus, the load is stopped exactly at the desired position without overloading the electric motor.

Because the piston and feed screw are connected at both ends of the piston by the screw coupling mechanisms, the feed screw moves the piston so stably that the load is stopped at the desired position with high accuracy.

Though the feed screw passes through the piston in the rodless cylinder, the screw thread sealing member on the piston that seals the screw thread on the feed screw at a position outside the coupling mechanism substantially eliminates the leak of compressed air through the screw thread. The sealing mechanism also surely prevents the entry of any foreign matter into the screw thread and the splash of grease from between the screw thread and balls. This assures exact and stable load positioning with high accuracy.

While the piston and table of the rodless cylinder are mechanically connected by a coupling member through a slit provided along the cylinder bore, the feed screw is disposed so as to pass through the piston in the rodless cylinder. This arrangement permits making the size of the whole positioner much smaller than conventional ones that employ magnetic couplings surrounding the body of the rodless cylinder for coupling.

DETAILED DESCRIPTION OF THE INVENTION

Figure 1:
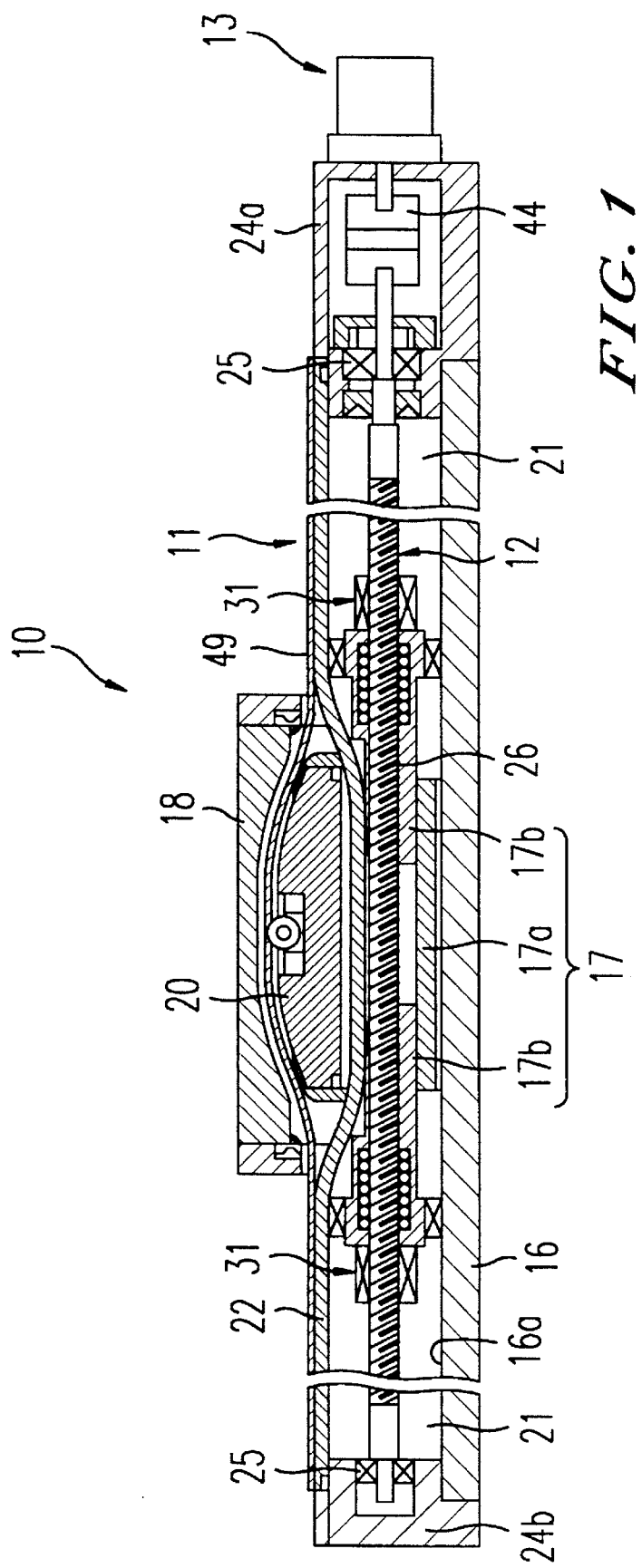
FIG. 1 is an axially cut cross-sectional front view of a first embodiment of the positioning apparatus according to this invention.

FIGS. 1 to 5 show a first embodiment of the positioning apparatus according to this invention. A positioning apparatus 10 comprises a rodless cylinder 11 actuated by compressed air or other pressurized fluid, a feed screw 12 passing through a piston 17 in the rodless cylinder 11, an electric motor 13 to turn the feed screw 12, a pressure control valve 14 and a changeover valve 15 (see FIG. 5) for supplying and discharging compressed air of a desired pressure into and from cylinder chambers 21 in the rodless cylinder 11.

Figure 2:
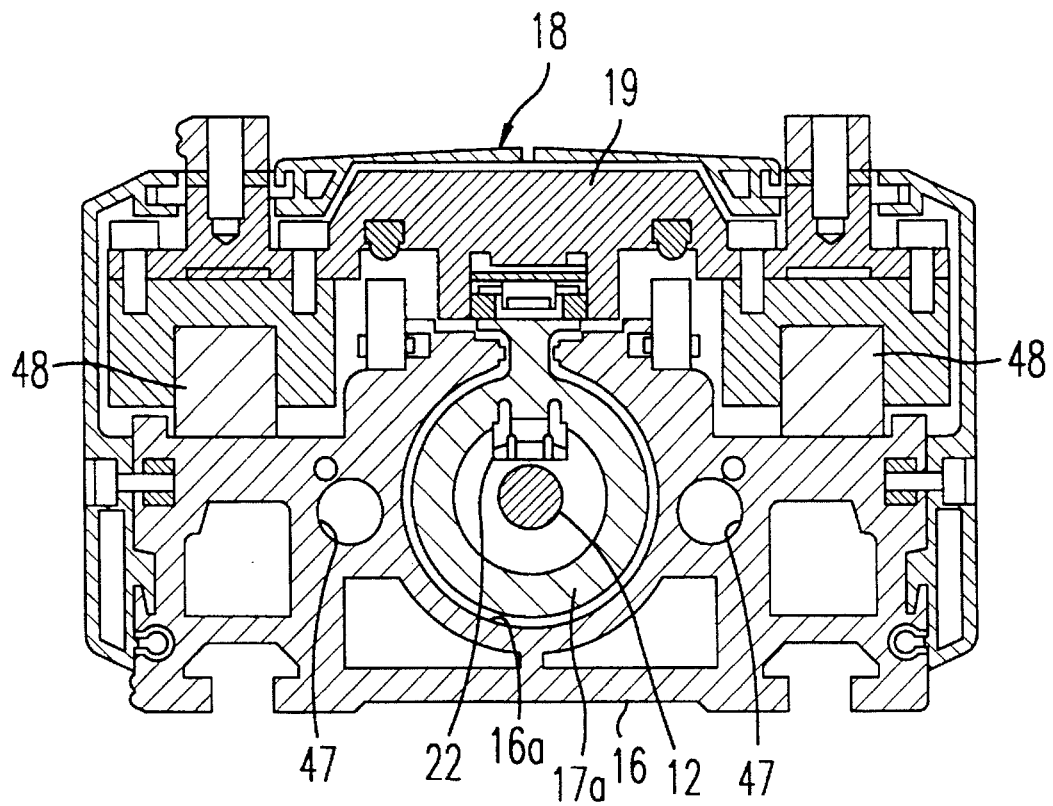
FIG. 2 is a cross-sectional side elevation of the positioning apparatus shown in FIG. 1 cut across the table therein.

The rodless cylinder shown in FIGS. 1 and 2 comprises a body 16, the piston 17 that moves in a cylinder bore 16a provided in the body 16, and a table 18 to hold a load that moves along the external surface of the body 16. The piston 17 and table 18 are connected together so as to move in one piece by a mechanical coupling unit 20 passed through a slit 19 formed in the body 16.

The piston 17 comprises a piston yoke 17a having a diameter smaller than the diameter of the cylinder bore 16a and pistons proper 17b suitably connected to both ends of the piston yoke 17a so as to hermetically move in the cylinder bore 16a. The slit 19 in the cylinder chambers 21 partitioned by the piston 17 is sealed by a seal belt 22 pressed from inside the cylinder bore 16a against the slit 19 by the compressed air supplied into the cylinder chambers 21.

While both ends of the cylinder bore 16a is closed with end plates 24a and 24b fitted to the body 16, the feed screw 12 passing through the piston 17 is rotatably supported by bearings 25 attached to the end plates 24a and 24b. Multiple screw threads (the illustrated embodiment has two threads) 26 are provided in the entire outer surface of the feed screw 12 except both ends thereof.

The screw threads 26 formed by thread rolling or grinding has an axial length substantially equal to the distance over which the load (not shown) mounted on the table 18 is moved. The open edge of the screw grooves may be formed into a small arched surface as required. A screw thread of a desired depth can be obtained by machining or grinding the periphery of a screw rod having a deeper screw thread.

Figure 3:
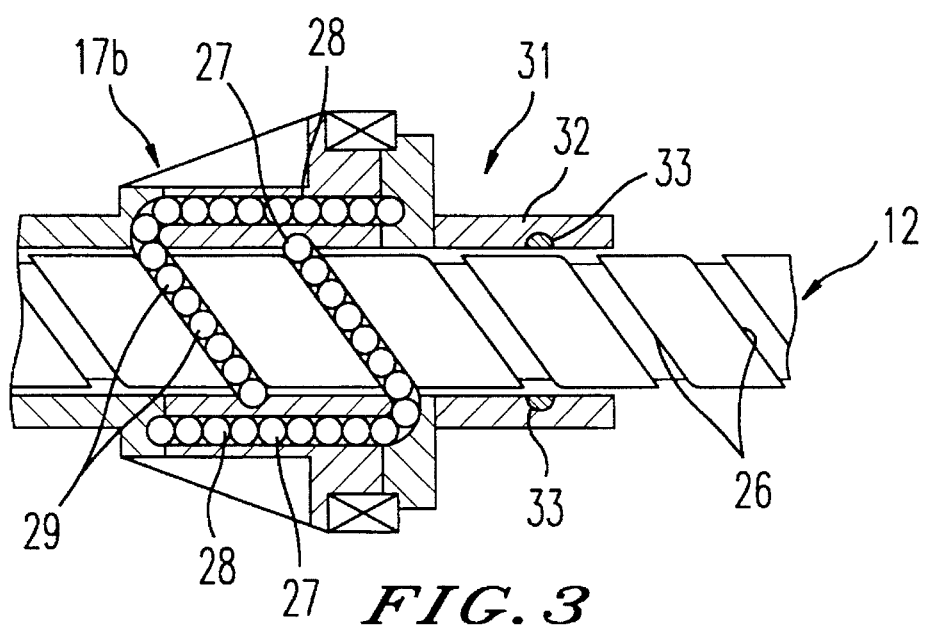
FIG. 3 is a cross-sectional view showing the principal part of the end of the piston.

The piston proper 17b has the same number of screw threads 27 of the same pitch as the screw threads 26 on the feed screw 12 formed on the inner surface thereof as shown in FIG. 3. The piston proper 17b also has an axially extending ball return bore 28 that brings both ends of the screw thread 27 into communication with each other provided in the thicker part thereof. A large number of balls 29 are rotatably inserted in the screw threads 26 and 27 and ball return bore 28. The piston proper 17b and feed screw 12 are screwed together at both ends of the piston 17 through the balls 29. The balls 29 enters the ball return bore 28 from one end of the screw thread 27 when the piston proper 17b moves along the feed screw 12 and returns to the other end of the screw thread 27 through the ball return bore 28.

Screwing together the piston 17 and feed screw 12 at both ends of the piston 17 assures a tight joint between the piston 17 and feed screw 12 and stabilizes the feed of the piston 17 by the feed screw 12.

The screw thread 27 and ball return bore 28 may be provided in the piston yoke 17a instead of the piston proper 17b.

The lead angle of the screw threads 26 and 27 on the feed screw 12 and piston proper 17b, which the tangent to the screw threads 26 and 27 makes with the plane normal to the axis of the feed screw 12, is 45 degrees or larger so that the piston 17 moves along the feed screw 12 by the rotation thereof when a force in the direction of the axis of the feed screw 12 acts on the piston 17.

A seal assembly 31 to prevent the leak of compressed air by sealing a space between the piston 17 and feed screw 12 is fitted at the end of each cylinder chamber 21 of the piston proper 17b on the outside of the screw coupling means. The seal assembly 31 comprises a cylindrical assembly proper 32 surrounding the feed screw 12 and a thread sealing member 33 engaging with the screw thread 26 formed on the inner surface thereof, as shown in FIG. 3. The thread sealing member 33 seals the screw thread 26 on the feed screw 12. The thread sealing member 33 also serves as a dust seal to prevent the entry of any foreign matter into the screw threads 26 and 27 and the splash of grease from between the screw threads 26 and 27 and balls 29.

The thread sealing member 33 has such a cross-sectional shape as to seal the screw thread 26. Ordinarily, the thread sealing member 33 is made as a helical piece of elastic synthetic rubber or resin having a low coefficient of friction that wraps the screw thread 26 at least once or, preferably, several times. The particularly preferable number of wrapping is two to three times. When the clearance between the sealing member 33 and screw thread 26 is small, the thread sealing member 33 may be made of metal.

The larger the number of wrapping made by the thread sealing member 33, the better the sealing provided thereby. Still, two to three times of wrapping is preferable as frictional resistance to the movement of the piston 17 increases with an increase in the number of wrapping.

The backlash caused by the screw threads can be decreased by preloading the piston prober 17b by interposing a spring (not shown) between the piston proper 17b and piston yoke 17a.

Figure 4:
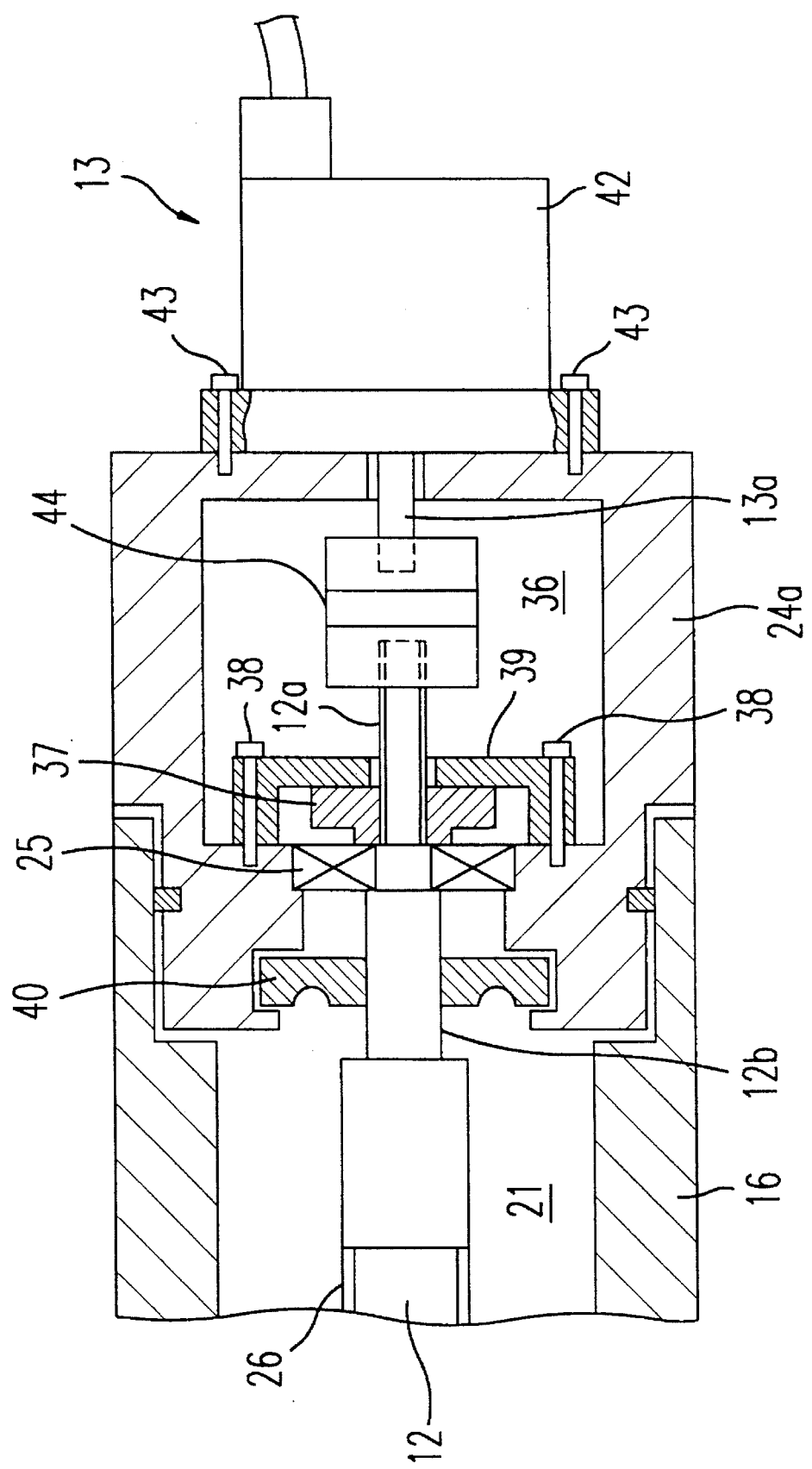
FIG. 4 is an enlarged cross-sectional view of the coupling at an end of the feed screw.

A small-diameter threaded rod 12a projects from one end of the feed screw 12 into a space 36 provided in the end plate 24a, with a lock nut 37 to hold the bearing 25 in position screwed on the threaded rod 12a, as shown in FIG. 4. A bearing holder 39 fastened to the end plate 24a with a bolt 38 restricts the outward axial motion of the lock nut 37. A sealing member 40 to seal the periphery of a cylindrical portion 12b between the tip of the feed screw 12 and the threaded portion 12a. A housing 42 of the electric motor 13 is fastened to the end plate 24a with a bolt 43. The housing 42 may also be formed integrally with the end plate 24a.

The threaded portion 12a of the feed screw 12 and the rotating shaft 13a of the electric motor 13 are connected in the space 36 with a coupling 44 so as to be integrally rotatable.

Figure 5:
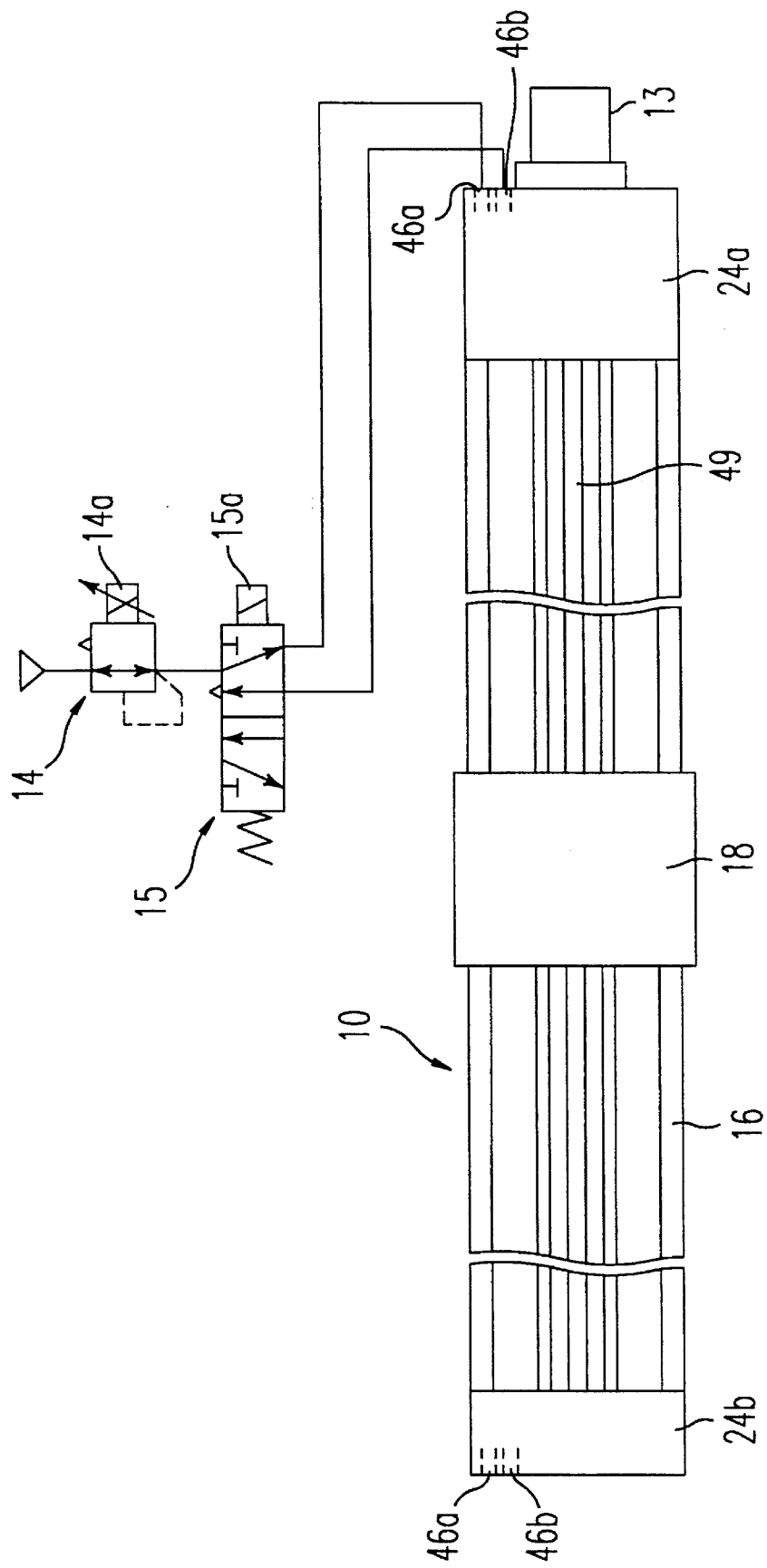
FIG. 5 is a plan view schematically illustrating the general construction of the first embodiment, with some parts omitted.

As schematically illustrated in FIG. 5, ports 46a and 46b for supplying and discharging compressed air into and from the cylinder chambers 21 are provided in the end plates 24a and 24b. The ports 46a and 46b individually communicate with the corresponding ports in the opposite end plates through passages 47 longitudinally provided in the body 15. Because compressed air can be thus supplied into and discharged from the cylinder chambers 21 from either of the end plates 24a and 24b, the position of the positioning apparatus is not restricted by the position of the ports.

When the positioning apparatus 10 is placed vertically for use as a load-lifting balancer, the upper port can be used as a breathing port.

The pressure control valve 14 is an electromagnetic proportional control valve that sends out compressed air of the amount proportional to the amount of electricity flowing to a proportional solenoid 14a. The changeover valve 15 is a five-port solenoid valve of the known type that supplies and discharges compressed air from the pressure control valve 14 into and from the cylinder chambers 21 by energizing and de-energizing a solenoid 15a. However, the pressure control valve 14 and changeover valve 15 are by no means limited to the types just described. The pressure control valve of any type that can change the pressure of the output fluid may serve the purpose of this invention. Similarly, the changeover valve may be of any type that can hydraulically or mechanically switch the communication between the ports. A four-port valve may serve the purpose, too.

Reference numeral 48 designates guides that guide the motion of the table 18. Each guide comprises a linear motion bearing, slide guide, cam follower and needle bearing. Reference numeral 49 denotes a dust seal to seal the slit 19.

The positioning apparatus 1 just described is ordinarily placed vertically and used as a load-lifting balancer, with the electric motor 13 disposed at the top or bottom. The operation of the positioning apparatus 1 used as a load-lifting balancer is as described below.

The changeover valve 15 supplies air of a given pressure from the pressure control valve 14 to a lower cylinder chamber 21, thereby discharging air from the upper cylinder chamber 21. Then, the supplied pressurized air pushes up the piston 17 and table 18. The piston 17 and table 18 stop after moving to the end of the screw thread 26 on the feed screw 12 or a position defined by a stopper or sensor, or near the target position to stop the load. The force exerted by the balls 29 rotates the feed screw 12 having a large lead angle, as a result of which the piston 17 moves upward along the feed screw 12.

When the piston 17 and table 18 stop, the pressure control valve 14 controls the air pressure so that the thrust force of the piston 17 (the pressure receiving area of the piston times the pressure of the supplied air) becomes substantially equal to the load acting on the piston 17. When the electric motor 13 turns the feed screw 12 in this state, the piston 17 and table 18 move up or down over a desired distance, thereby allowing the load mounted on the table 18 to stop exactly at the desired position.

Even when a heavy load is mounted on the table 18, no overloading of the electric motor 13 occurs because the load and the thrust force of the piston 17 in the rodless cylinder are balanced. Therefore, even a heavy load can be stopped at the exact position desired. Besides, the piston 17 and feed screw 12 connected by the screw coupling mechanism at both ends of the piston 17 stabilize the feed of the piston 17 by the feed screw 12, thereby increasing the accuracy of load stopping.

Even when the positioning apparatus 10 is vertically disposed for use as a balancer to lift a heavy load, no overloading of the electric motor 13 and, therefore, no positioning error occur.

In the positioning apparatus 10 just described, the piston 17 in the rodless cylinder 11 and the table 18 are mechanically connected with the coupling unit 20 through the slit 19 extending along the cylinder bore 16a, with the feed screw 12 fitted so as to pass through the piston 17 in the rodless cylinder 11. Therefore, the whole assembling apparatus 10 is much smaller than the conventional ones that employ a magnetic coupling surrounding the body of the rodless cylinder and a feed screw disposed outside the rodless cylinder.

The helical thread sealing member 33 on the piston 17 seals the screw thread 26 on the feed screw 12 at a position outside the screw coupling mechanism. This arrangement not only eliminates the leak of compressed air through the screw thread 26, even with the feed screw 12 passing through the piston 17 in the rodless cylinder 11, but also prevents the entry of foreign matters into the screw threads 26 and 27 and the splash of grease from between the screw threads 26 and 27 and the balls 29. This entails a sure, stable and accurate load positioning.

Figure 6:
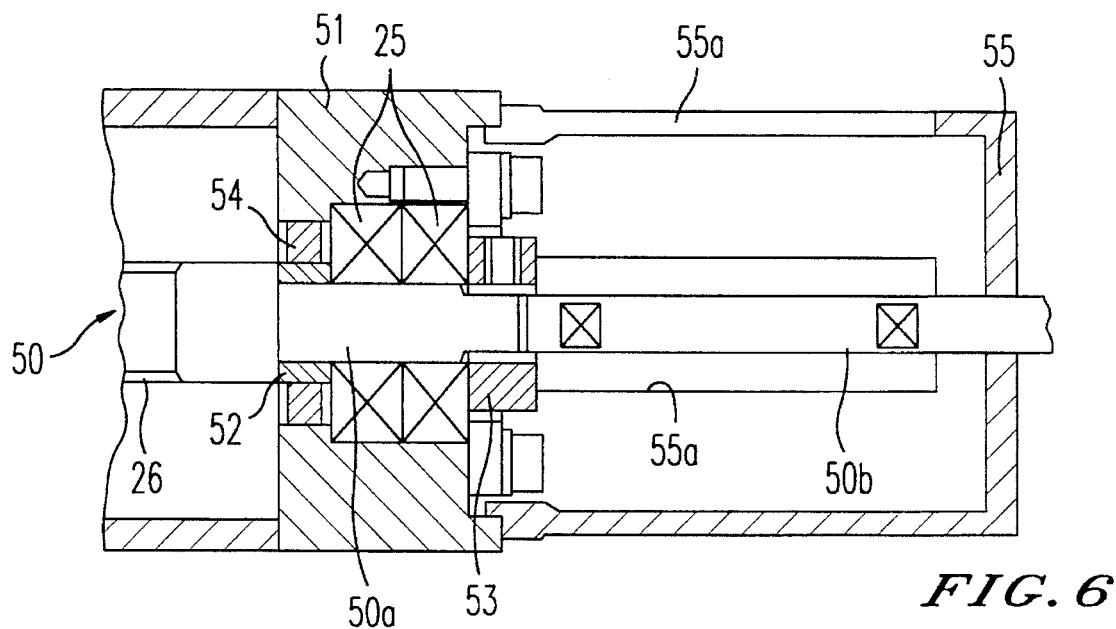
FIG. 6 is a cross-sectional view showing the principal part of a modification of the first embodiment.

FIG. 6 shows a modification of the first embodiment of this invention. This modification comprises a feed screw 50 that has smaller-diameter portions 50a and 50b leading to an electric motor (not shown). The smaller-diameter portion 50b and the rotor of the electric motor are integrally formed, thus eliminating the need for a coupling. A lock nut 53 screwed onto the smaller-diameter portion 50a prevents the axial motion of a spacer 52 and bearings 25 attached to an end plate 51. An oil seal 54 is fitted around the annular spacer 52.

Reference numeral 55 in FIG. 6 designates an adapter interposed between the end plate 50 and electric motor. The adapter 55 has multiple windows 55a.

Detailed description of this modification is omitted because it is analogous to the first embodiment except for the elimination of the coupling means.

Figure 7:
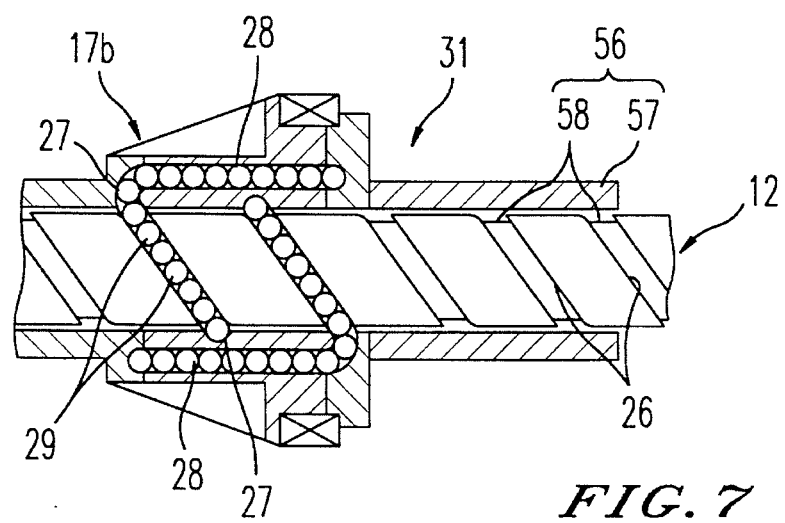
FIG. 7 is a cross-sectional showing the principal part of the construction at an end of the piston of a second embodiment of this invention.

FIG. 7 shows a second embodiment of this invention that has a seal assembly 56 comprising an assembly proper 57 integrally formed with a thread sealing member 58. The assembly proper 57 and thread sealing member 58 provided in one piece reduces the number of parts making up the whole positioning apparatus and facilitates the replacement of the seal assembly 56.

Detailed description of the second embodiment is omitted because it is analogous to the first embodiment in other respects of construction and operation.

The embodiments described above are disposed upright for use as load-lifting balancers. However, the position off the embodiments is by no means limited thereto. They may also be disposed obliquely or horizontally.

The embodiments described above perform positioning by rotating the feed screw by actuating the electric motor after balancing the load moved close to the desired position by the rodless cylinder with the thrust force of the piston. Instead, the rodless cylinder and electric motor may be simultaneously actuated so as to move and position the load by rotating the feed screw by the electric motor while pushing the load with the rodless cylinder. In this case, the lead angle of the screw threads on the feed screw and piston need not be larger than 45 degrees. The lead angle smaller than 45 degrees is also permissible.

Figure 8:
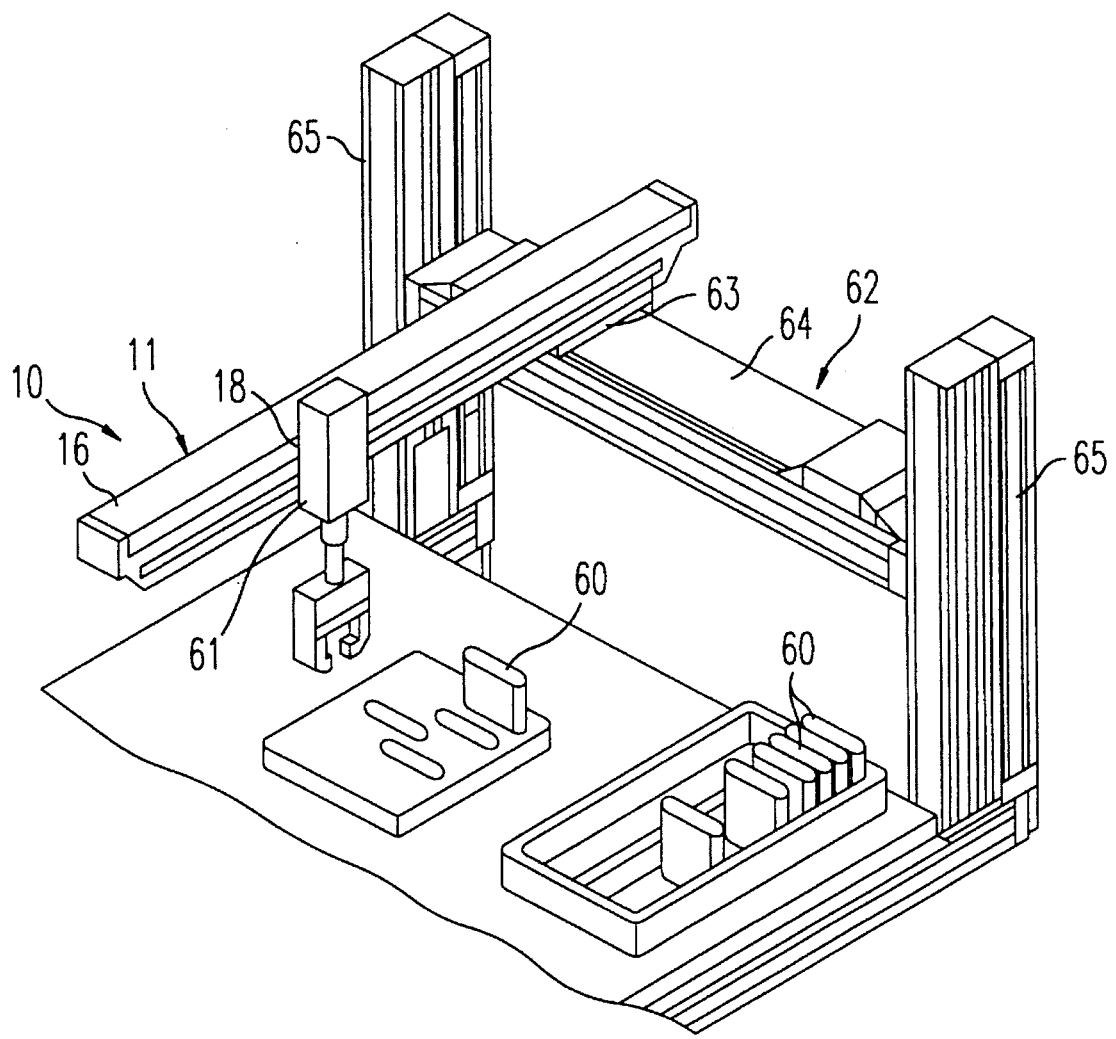
FIG. 8 is a perspective view showing an example of application in which the positioning apparatus of this invention is used.

FIG. 8 shows an example of applications to which the positioning apparatus according to this invention is put. A rodless cylinder 11 of a positioning apparatus 10 is disposed substantially horizontally, with a pneumatic chuck 61 to hold a work 60 mounted on a table 18. The body 16 of the rodless cylinder 11 is attached to a table 63 on another rodless cylinder 62 extending substantially perpendicular thereto. The vertically movable body 64 of the rodless cylinder 62 is held between the longitudinal supports 65 on both sides thereof.

This arrangement permits moving the pneumatic chuck 61 holding the work 60 three dimensionally, whereby the work 60 can be moved to any desired position.

Figure 9:
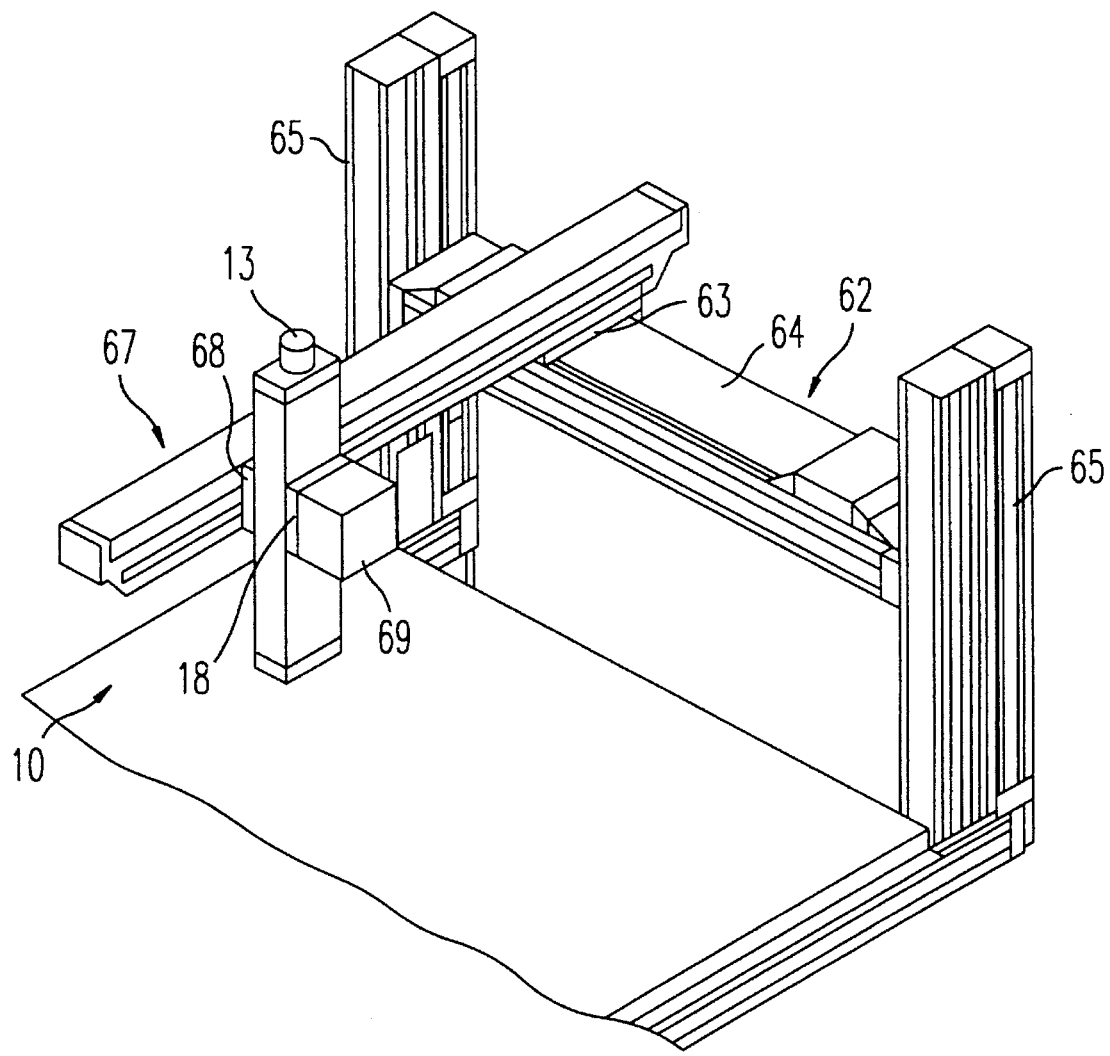
FIG. 9 is a perspective view showing another example of application in which the positioning apparatus of this invention is used.
Figure 10:
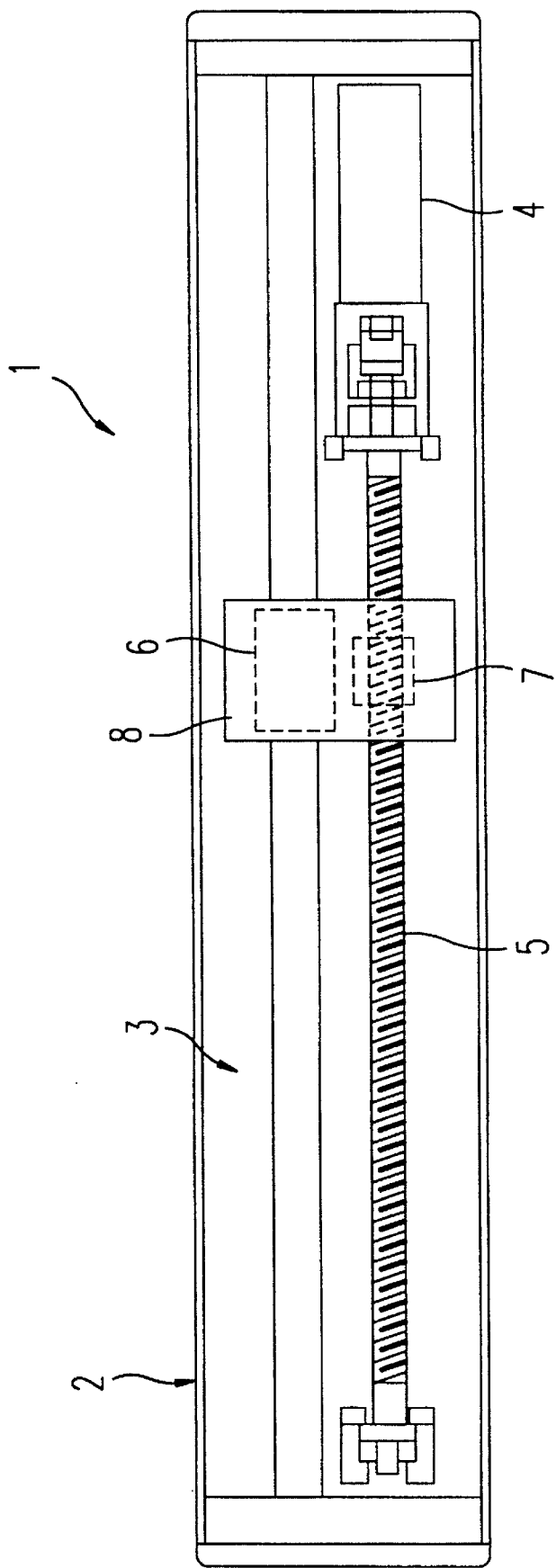
FIG. 10 is a schematic plan view of a conventional positioning apparatus.

FIG. 9 shows another application of the positioning apparatus according to this invention. A load positioning apparatus 10 shown here is mounted substantially upright on a table 68 of a rodless cylinder 67 that is placed substantially horizontally. The load positioning apparatus 10 serves as a balancer to lift a load 69 mounted on the table 18.

Other parts of the embodiment shown in FIG. 9 and the operation thereof are similar to those of the embodiment shown in FIG. 8. Therefore, similar parts are designated by similar reference numerals, with detailed description thereof omitted.

The rodless cylinders 62 and 67 comprise a piston and a table connected by a mechanical coupling means 20, as in the rodless cylinder 10 described before.

What is claimed is:

1. A load positioning apparatus comprising a rodless cylinder including a piston adapted to reciprocate in a cylinder bore provided in the body of the apparatus by the action of a pressurized fluid and a load-mounting table slidable along the external surface of the body, with the piston and table joined together by a coupling device, a feed screw turned and driven by an electric motor, and a pressurized fluid control and supply device to supply a fluid of a desired pressure to the rodless cylinder;

the coupling device mechanically connecting the piston and table through a slit provided along the cylinder bore;

the feed screw being disposed to pass through the piston in the rodless cylinder and connected to the piston with a screw coupling mechanism which includes at least one screw thread cut in each of the piston and feed screw and multiple balls rotatably fitted between the screw threads (and provided at each end of the piston); and said load positioning apparatus further comprising a thread sealing member to seal the space between the piston and feed screw at the screw thread on the feed screw which thread screwing member is provided (outside the screw coupling mechanism at each end of the piston,)

said thread sealing member including a helical piece surrounding the screw thread on the feed screw.

2. A load positioning apparatus according to claim 1, in which the thread sealing member is formed integrally with the piston.

3. A load positioning apparatus according to claim 1, in which the screw threads cut on the piston and feed screw have a lead screw of 45 degrees or larger.

* * * * *